United States Patent
Artus et al.

(10) Patent No.: US 11,618,360 B2
(45) Date of Patent: Apr. 4, 2023

(54) ARMREST ARRANGEMENT, VEHICLE SEAT, AND VEHICLE

(71) Applicant: Bayerische Motoren Werke Aktiengesellschaft, Munich (DE)

(72) Inventors: Enrico Artus, Jesenwang (DE); Stefan Feulner, Pfaffenhofen (DE); Patrick Mahler, Illertissen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 47 days.

(21) Appl. No.: 17/289,962

(22) PCT Filed: Oct. 17, 2019

(86) PCT No.: PCT/EP2019/078237
§ 371 (c)(1),
(2) Date: Apr. 29, 2021

(87) PCT Pub. No.: WO2020/088946
PCT Pub. Date: May 7, 2020

(65) Prior Publication Data
US 2022/0009391 A1    Jan. 13, 2022

(30) Foreign Application Priority Data
Oct. 30, 2018    (DE) .................... 10 2018 127 112.3

(51) Int. Cl.
*B60N 2/75*    (2018.01)
(52) U.S. Cl.
CPC ............. *B60N 2/773* (2018.02); *B60N 2/767* (2018.02)

(58) Field of Classification Search
CPC ........ B60N 2/773; B60N 2/767; B60N 2/787
See application file for complete search history.

(56) References Cited

U.S. PATENT DOCUMENTS

| 4,118,069 A | 10/1978 | Hunter |
| 5,597,209 A | 1/1997 | Bart et al. |

(Continued)

FOREIGN PATENT DOCUMENTS

| CN | 102215718 A | 10/2011 |
| CN | 103129425 A | 6/2013 |

(Continued)

OTHER PUBLICATIONS

International Search Report (PCT/ISA/210) issued in PCT Application No. PCT/EP2019/078237 dated Jan. 28, 2020 with English translation (seven (7) pages).

(Continued)

*Primary Examiner* — Philip F Gabler
(74) *Attorney, Agent, or Firm* — Crowell & Moring LLP

(57) ABSTRACT

An armrest arrangement for a vehicle seat includes a mounting fitting to be mounted on a vehicle seat, and an armrest body having a trunk and a support element having an arm support surface for receiving an arm of a user when using the armrest arrangement. The armrest body having the trunk can be detachably attached to the mounting fitting. When mounted on the mounting fitting, the armrest body is pivotable about an axis of rotation with respect to the mounting fitting. The support element can be displaced with the arm support surface relative to the trunk in a longitudinal extension direction of the trunk.

11 Claims, 9 Drawing Sheets

(56) References Cited

U.S. PATENT DOCUMENTS

| | | | |
|---|---|---|---|
| 5,902,005 A | 5/1999 | Lewczyk et al. | |
| 7,828,390 B2 * | 11/2010 | Liu | B60N 2/753 |
| | | | 297/411.36 |
| 8,132,861 B2 * | 3/2012 | Cone | B60N 2/753 |
| | | | 297/411.32 |
| 8,333,432 B2 * | 12/2012 | Cone | B60N 2/753 |
| | | | 297/411.32 |
| 2002/0105217 A1 | 4/2002 | Khedira et al. | |
| 2007/0241603 A1 | 10/2007 | Otto | |
| 2010/0289317 A1 | 11/2010 | Cone | |
| 2013/0175837 A1 | 7/2013 | Buehlmeyer et al. | |
| 2018/0007220 A1 | 3/2018 | Bohlke et al. | |
| 2018/0072200 A1 * | 3/2018 | Bohlke | B60N 2/75 |

FOREIGN PATENT DOCUMENTS

| | | |
|---|---|---|
| CN | 104827936 A | 8/2015 |
| CN | 108297757 A | 7/2018 |
| DE | 3529957 A1 | 3/1987 |
| DE | 197 51 492 A1 | 6/1998 |
| DE | 100 50 528 A1 | 4/2002 |
| DE | 10 2004 011 385 A1 | 9/2005 |
| DE | 10 2016 217 454 A1 | 3/2018 |
| FR | 2 789 142 A1 | 8/2000 |

OTHER PUBLICATIONS

German-language Written Opinion (PCT/ISA/237) issued in PCT Application No. PCT/EP2019/078237 dated Jan. 28, 2020 (seven (7) pages).

German-language Search Report issued in German Application No. 10 2018 127 112.3 dated Jul. 12, 2019 with partial English translation (12 pages).

German-language Office Action issued in German Application No. 10 2018 127 112.3 dated Jul. 15, 2019 (3 pages).

English translation of Chinese-language Office Action issued in Chinese Application No. 201980069184.8 dated Jul. 29, 2022 (seven (7) pages).

* cited by examiner

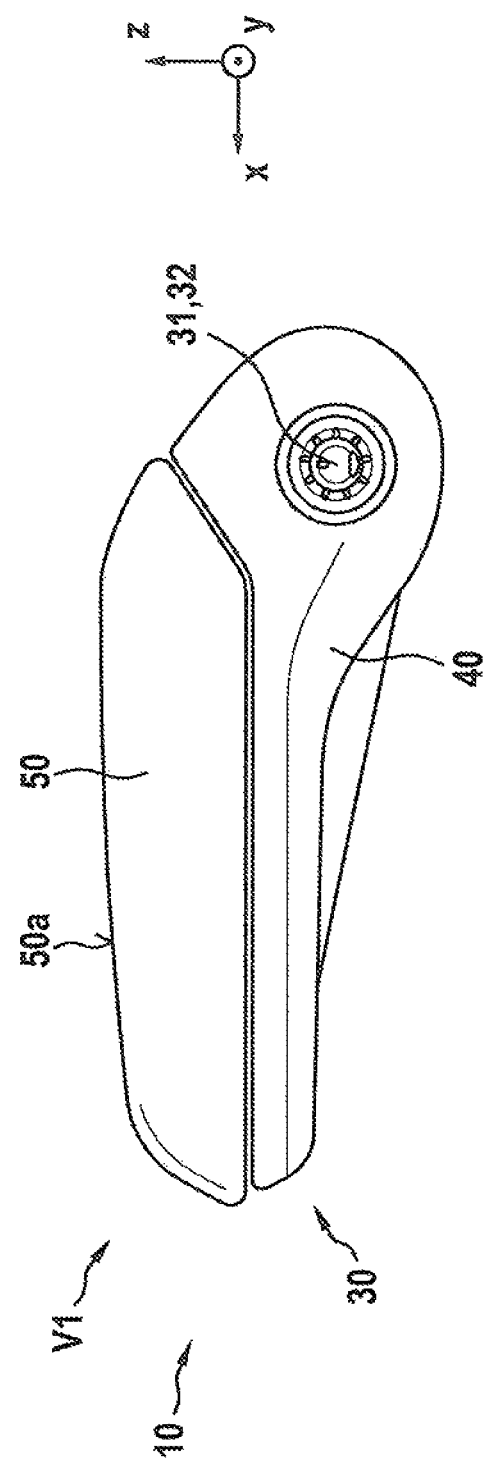
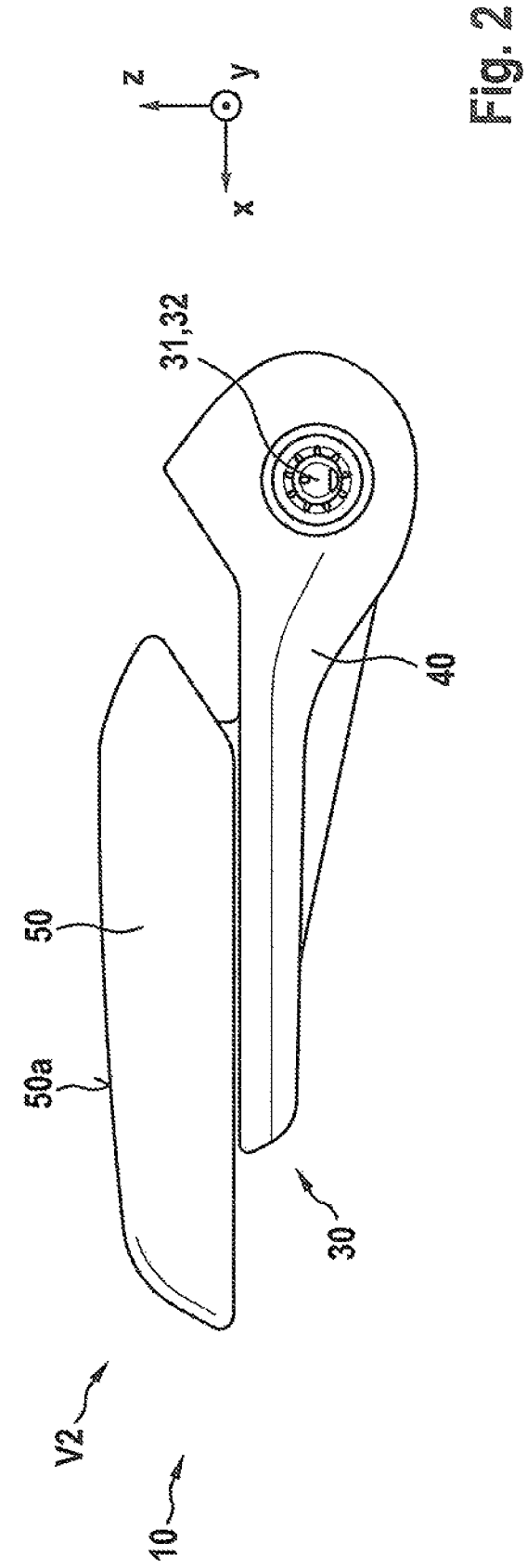

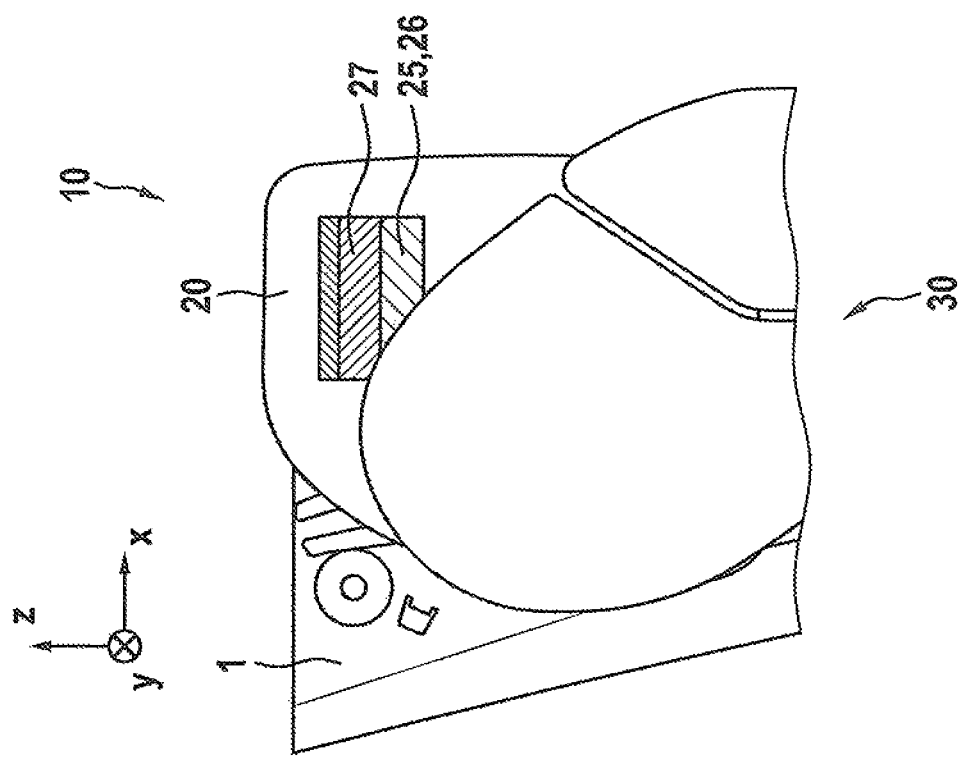
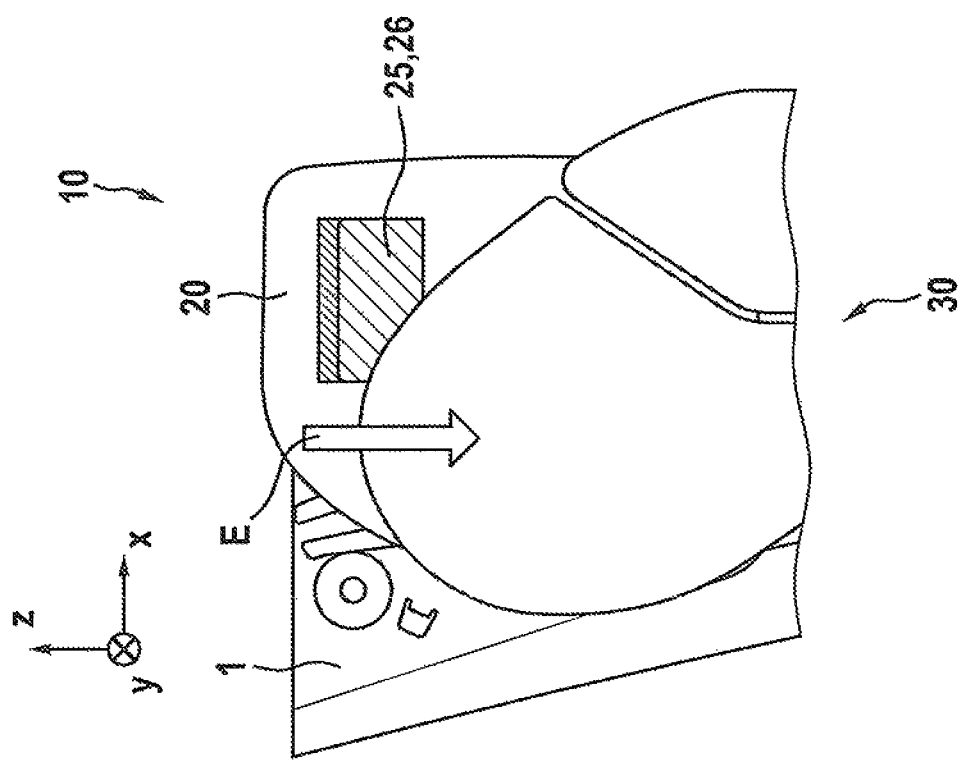

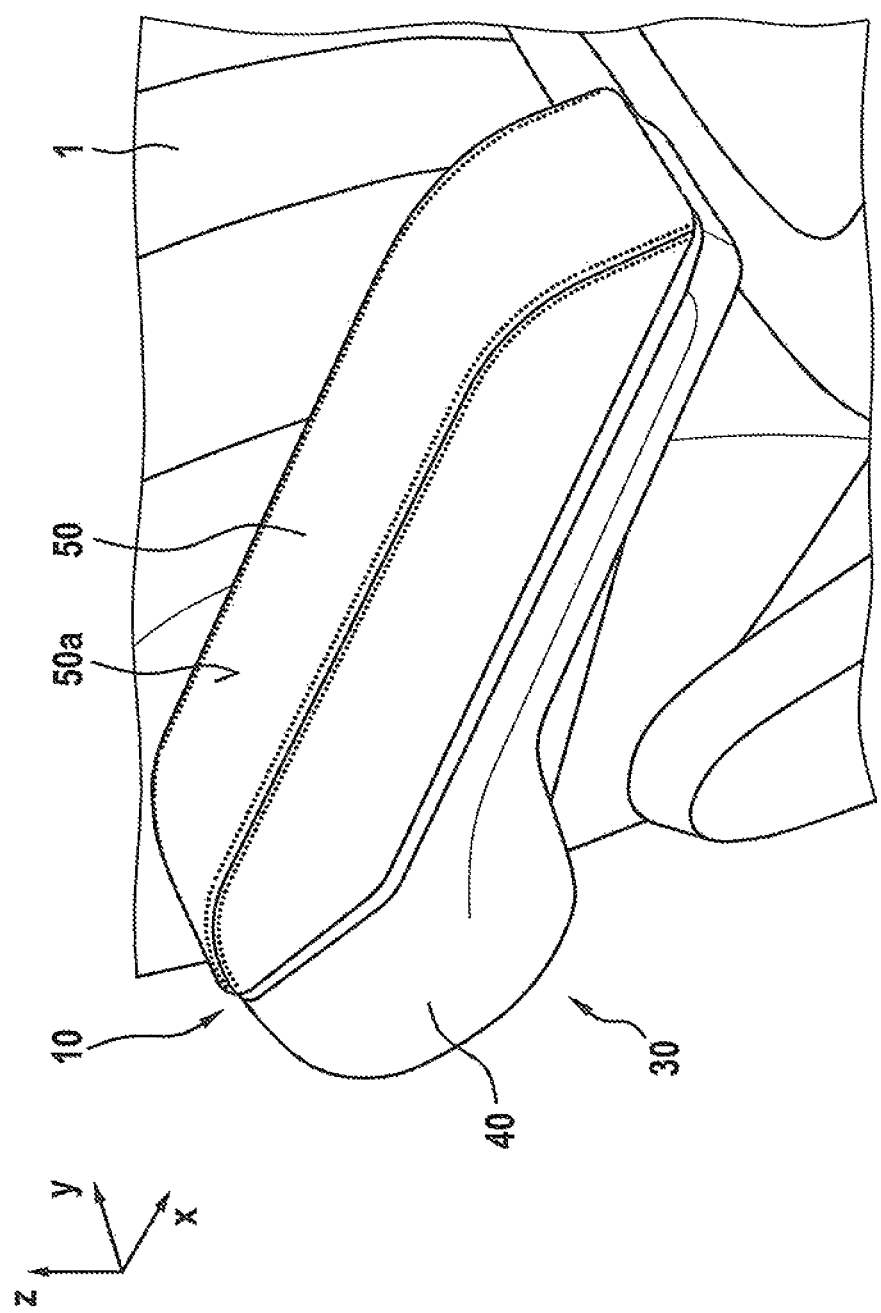

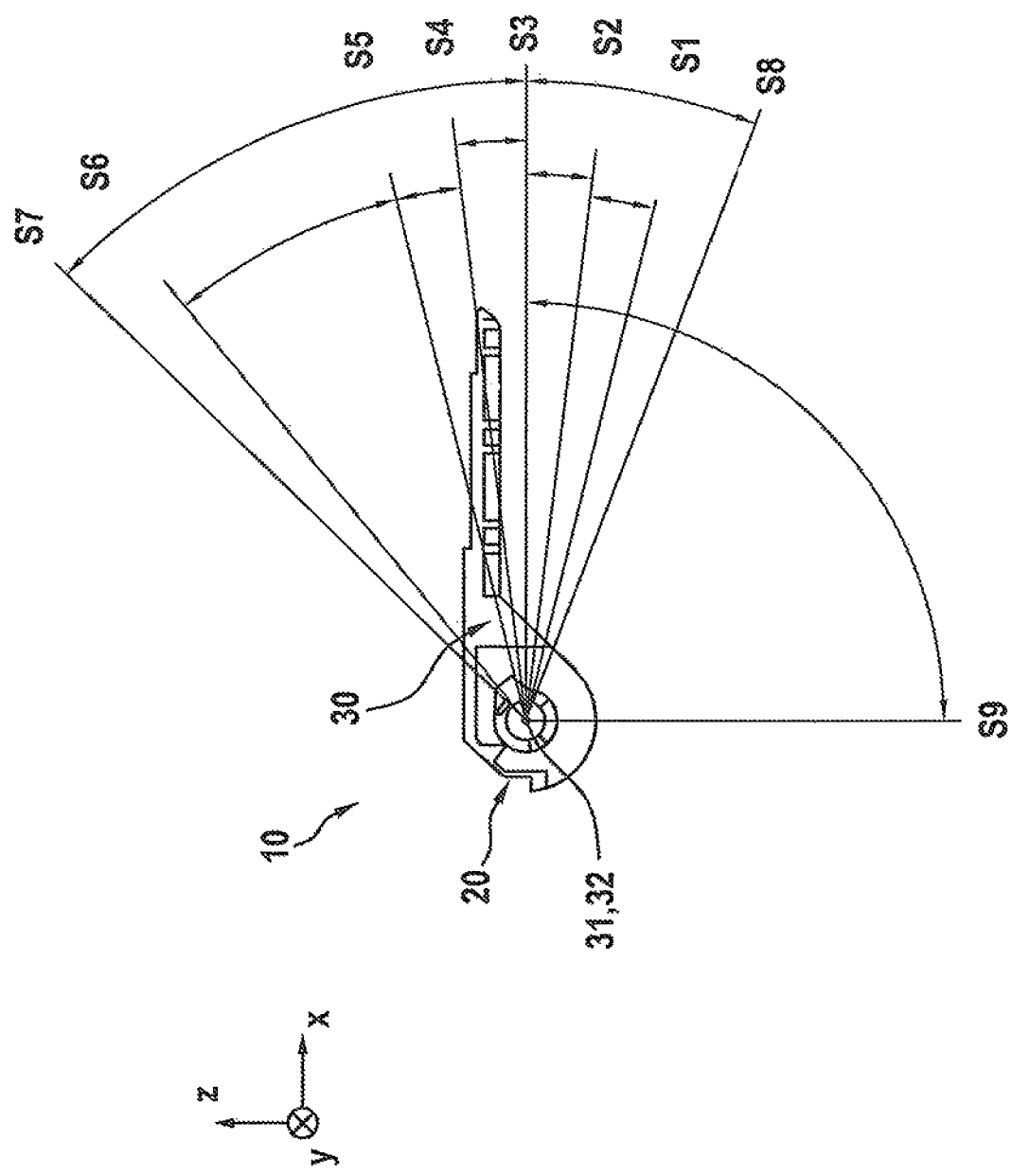

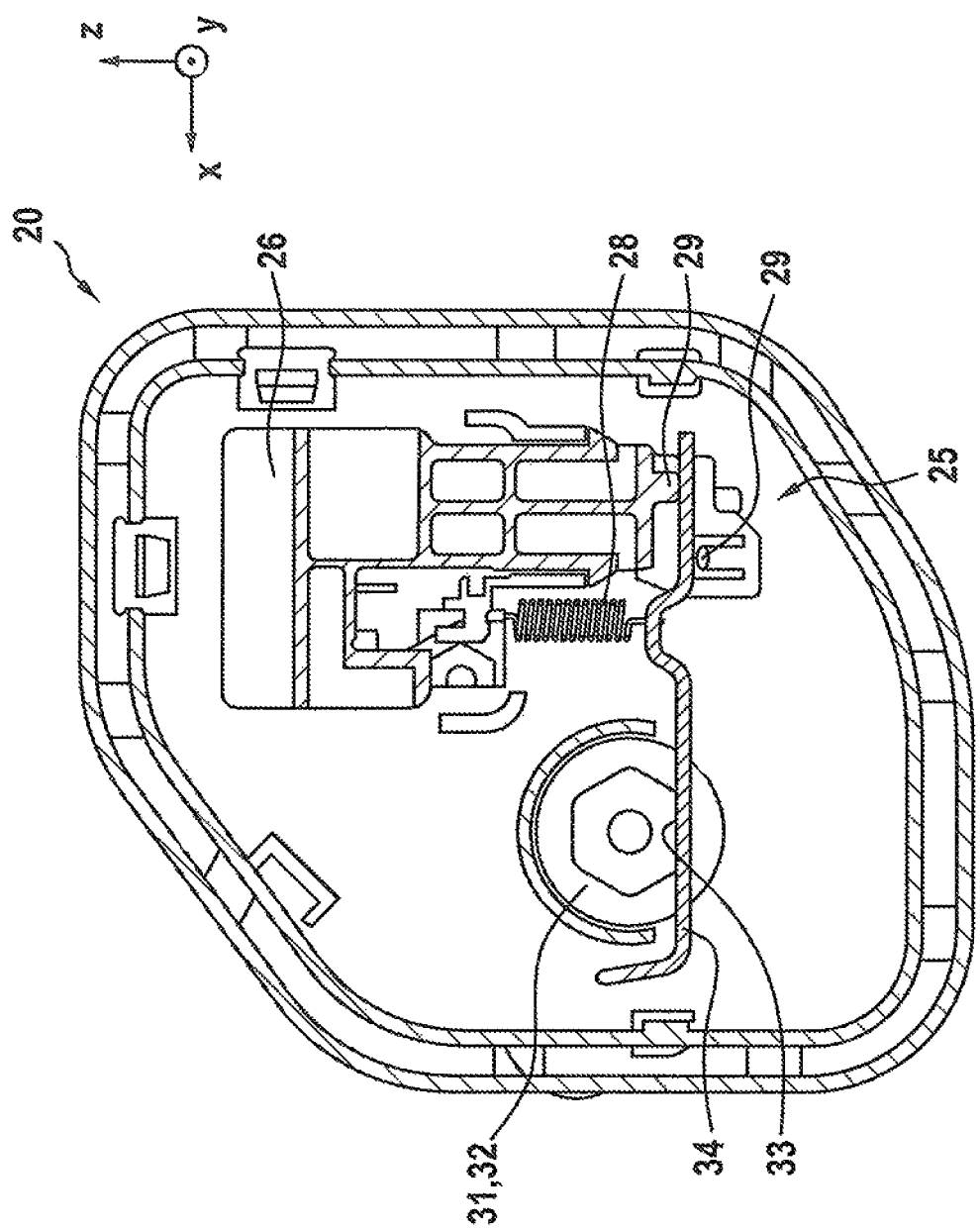

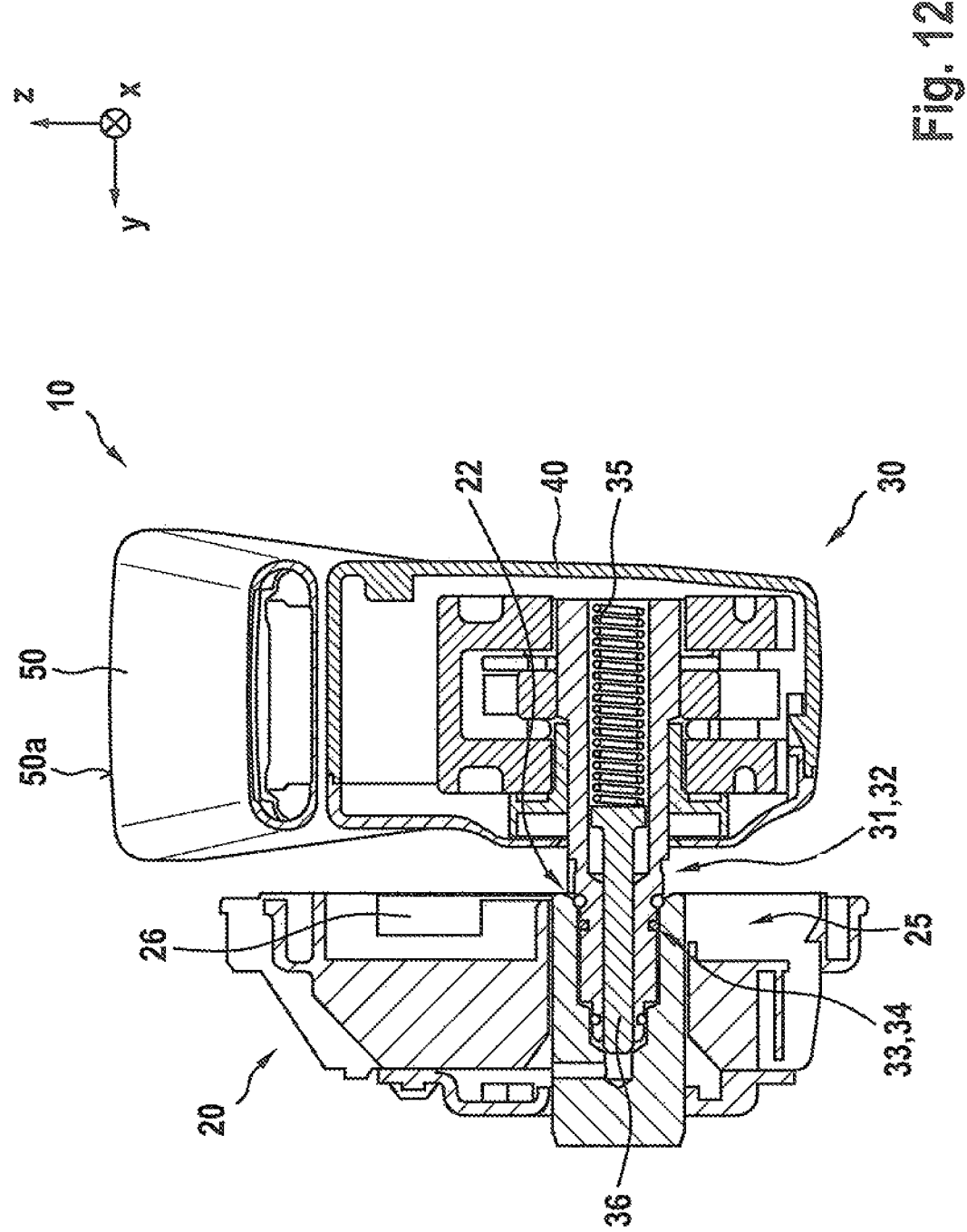

ARMREST ARRANGEMENT, VEHICLE SEAT, AND VEHICLE

BACKGROUND AND SUMMARY OF THE INVENTION

The present invention relates to an armrest arrangement for a vehicle seat, to a vehicle seat as such, and to a vehicle.

Seats in vehicles are frequently provided with armrests to increase comfort. Armrests of this type are partially designed to be adaptable with regard to the ergonomic characteristics of different users.

However, existing designs are limited with regard to their ergonomic adaptability and in respect of their possibilities of being able to adapt to requirements for enhancing the passenger compartment.

The invention is based on the object of providing an armrest arrangement for a vehicle seat and a vehicle seat and a vehicle as such, in which a particularly high degree of adaptability in an ergonomic respect and with regard to enhancing the passenger compartment is achieved using simple means.

The object on which the invention is based is achieved by an armrest arrangement, a vehicle seat, and a vehicle, according to the claimed invention. Advantageous developments are the subject matter of the respective dependent claims.

According to a first aspect of the present invention, an armrest arrangement for a vehicle seat is proposed, which armrest arrangement (i) has a mounting fitting for mounting on the vehicle seat and (ii) an armrest body having a trunk and having a support element with an arm support surface for receiving a user's arm during use of the armrest arrangement. The armrest body having the trunk is attachable releasably here to the mounting fitting. The armrest body in a state attached to the mounting fitting is pivotable about a pivot axis in relation to the mounting fitting. Furthermore, the support element with the arm support surface is displaceable in relation to the trunk in a direction of longitudinal extent of the trunk. The measures provided according to the invention achieve an extremely high degree of comfort and flexibility during use of the armrest arrangement by the armrest body being able to be removed from the mounting fitting and, in the mounted state, providing a multiplicity of adjustment possibilities for ergonomic adaptation to the user.

According to an advantageous embodiment of the armrest arrangement according to the invention, the armrest body in a state attached to the mounting fitting can be pivotable in relation to the mounting fitting to a plurality of releasably lockable pivoting positions, in particular with different angles of inclination of the arm support surface. This permits a particularly high degree of adaptability to the ergonomic requirements of the user. The pivoting positions can be distributed discretely or continuously over a certain spatial angle.

The pivoting capability is provided by various mechanisms. In another development of the armrest arrangement according to the invention, a particularly stable arrangement is produced if said armrest arrangement is formed with a pivoting and mounting pin via which the armrest body can be mounted releasably with respect to the mounting fitting and about which the armrest body is pivotable in relation to the mounting fitting with definition of the pivot axis.

The mounting fitting and mounting pin of the armrest body can advantageously have a coding of preferably mechanical and geometric design in order to avoid mixing up armrest arrangements (on the left/right) and/or wrongly orienting them in or on the fitting as they are being installed.

Accordingly, it is of advantage if the armrest arrangement according to the invention is formed here with a receiving part, in particular in the manner of a receiving opening, for receiving the pivoting and mounting pin in a state of the armrest body attached to the mounting fitting.

With regard to the configuration and attaching of the pivoting and mounting pin and the receiving part there are various possibilities for realizing them.

Firstly, the pivoting and mounting pin can be formed on the armrest body and the receiving part can be formed on the mounting fitting.

As an alternative thereto, it is possible to form the pivoting and mounting pin on the mounting fitting and to form the receiving part on the armrest body.

According to a further alternative or additional exemplary embodiment of the armrest arrangement according to the invention, the armrest body in a state attached to the mounting fitting can be releasable from the mounting fitting in a predetermined pivoting position in relation to the mounting fitting and in particular only in this predetermined pivoting position, in the axial direction of a or the pivoting and mounting pin and/or in a controllable manner.

Particularly reliable operation of the armrest arrangement according to the invention arises if, according to another embodiment of the invention, the armrest arrangement is formed with a locking mechanism, preferably in the region of the mounting fitting, wherein the locking mechanism is designed in particular to automatically lock the armrest body to the mounting fitting when the armrest body is attached to the mounting fitting.

Complete locking of the system can be advantageously indicated to the user by a marking provided on the button and/or by the position of the button in the mounting fitting.

In addition, in a development of the armrest arrangement according to the invention, the locking mechanism is actuable manually and/or is designed so as, in the attached state of the armrest body, upon manual actuation to unlock the armrest body from the mounting fitting and to release it for removal, in particular for removal in the axial direction with respect to the pivoting and mounting pin.

In this case, it is of particular advantage if the locking mechanism:
(i) has an actuating element and in particular a button or a slider for the manual actuation,
(ii) has an, in particular mechanically controlled, viewing area for the visual and in particular colored indication of a state of the locking and/or of a state of the unlocking of the locking mechanism, and/or
(iii) is designed to lock an armrest body only in a state completely attached to the mounting fitting, and/or to remove an armrest body which is unlocked or is not completely attached to the mounting fitting from a mounting position with power assistance and in particular spring assistance and in particular to separate a pivoting and mounting pin and a receiving part from each other.

A further increase in the comfort can be additionally or alternatively achieved in another embodiment of the armrest arrangement if the support element is displaceable in relation to the trunk of the armrest body between a plurality of displacement positions, wherein the displacement positions can in particular be designed to be releasably lockable, in particular via a ball-mounted support, support surface or rail and/or with pressure-point-controlled actuation. The displacement positions can be distributed discretely or continuously along a predetermined displacement path.

According to another aspect of the present invention, a vehicle seat as such is also provided which is formed with at least one armrest arrangement designed according to the invention, wherein the armrest arrangement is attached in particular to a side surface or to a side region of the vehicle seat.

Furthermore, the present invention also provides a vehicle as such which has at least one vehicle seat according to the invention, wherein the armrest arrangement is attached in particular to a side surface of the vehicle seat, which side surface is oriented toward an inside of the vehicle.

BRIEF DESCRIPTION OF THE FIGURES

Further details, features and advantages of the invention emerge from the description below and the figures.

BRIEF DESCRIPTION OF THE DRAWINGS

FIGS. 1 and 2 show, in schematic side views, an embodiment of the armrest arrangement according to the invention in two different displacement states of a support element in relation to a trunk.

FIGS. 3 to 6 show, in schematic side views, another embodiment of the armrest arrangement according to the invention in various operating states for normal use and for unlocking and removal.

FIG. 7 shows, in a schematic and perspective view, another embodiment of the armrest arrangement according to the invention.

Figure 8:
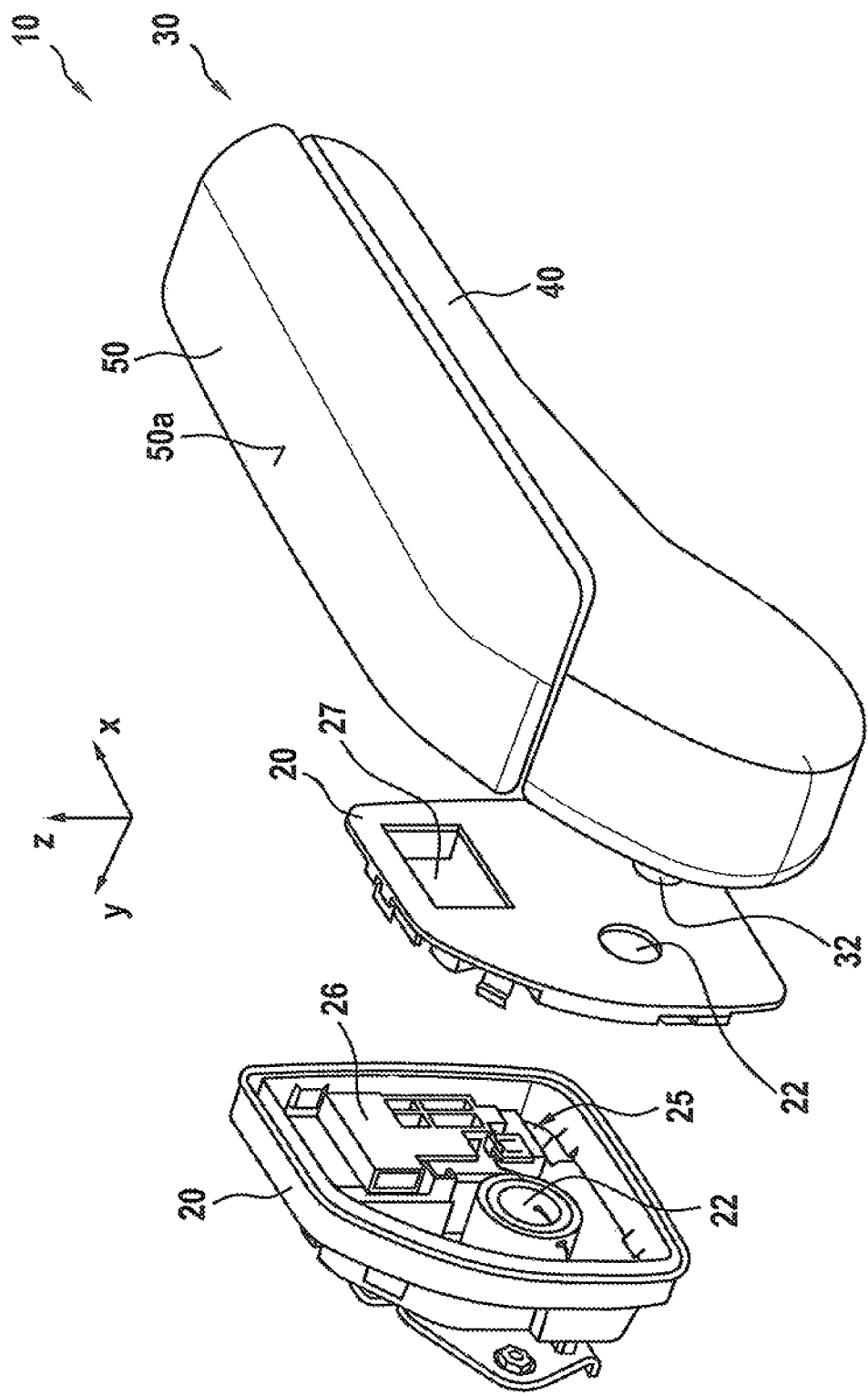
Figure 9:
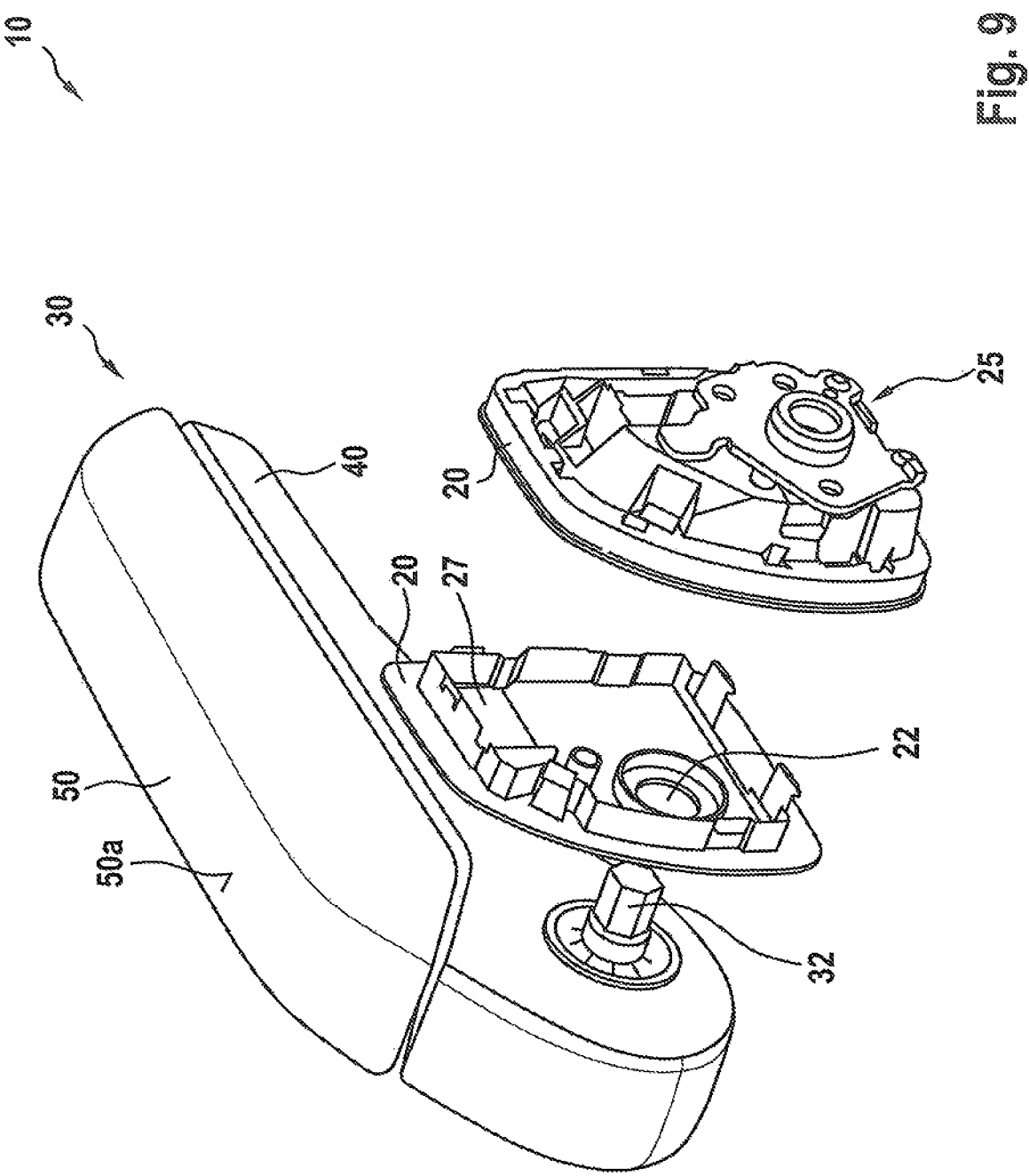

FIGS. 8 and 9 show perspective exploded illustrations of a further embodiment of the armrest arrangement according to the invention.

FIG. 10 shows an embodiment of the armrest arrangement according to the invention with respect to various pivoting positions of an armrest body in relation to a mounting fitting.

FIGS. 11 and 12 explain, with reference to schematic diagrams, the construction and the function of a locking unit and of the components for an ejection function.

DETAILED DESCRIPTION OF THE DRAWINGS

Exemplary embodiments and the technical background of the invention will be described in detail below with reference to FIGS. 1 to 12. Identical and equivalent and identically or equivalently acting elements and components are denoted by the same reference signs. The detailed description of the denoted elements and components is not reproduced each time they occur.

The illustrated features and further properties can be isolated from one another in any form and combined with one another as desired without departing from the core of the invention.

FIGS. 1 and 2 show, in schematic side views, an embodiment of the armrest arrangement 10 in two different displacement states V1 and V2 of a support element 50 with a support surface 50a, which may also be referred to as an arm support surface, in relation to a trunk 40 of the armrest body 30.

The armrest body 30 according to FIGS. 1 and 2 is designed to be attached by means of a mounting fitting 20, which is not illustrated here, to a vehicle seat 1, which is likewise not illustrated here.

After mounting on the respective vehicle seat, the armrest body 30 is pivotable in relation to the mounting fitting 20 about a pivot axis 31 which is defined by a corresponding pivoting and mounting pin 32.

Further aspects in this regard—in particular also with regard to the locking function and the ejection function—will also be explained further below in conjunction with FIGS. 11 and 12.

FIGS. 3 to 6 show, in schematic side views, another embodiment of the armrest arrangement 10 in various operating states S3 and S9 for normal use in state S3 with a certain pivoting angle, and for unlocking and removal in state S9.

In the illustration of FIGS. 3 to 6, the attaching of the armrest body 30, consisting of the trunk 40 and the support element 50, via the mounting fitting 20 mounted on the vehicle seat 1 can likewise be seen.

Figure 3:
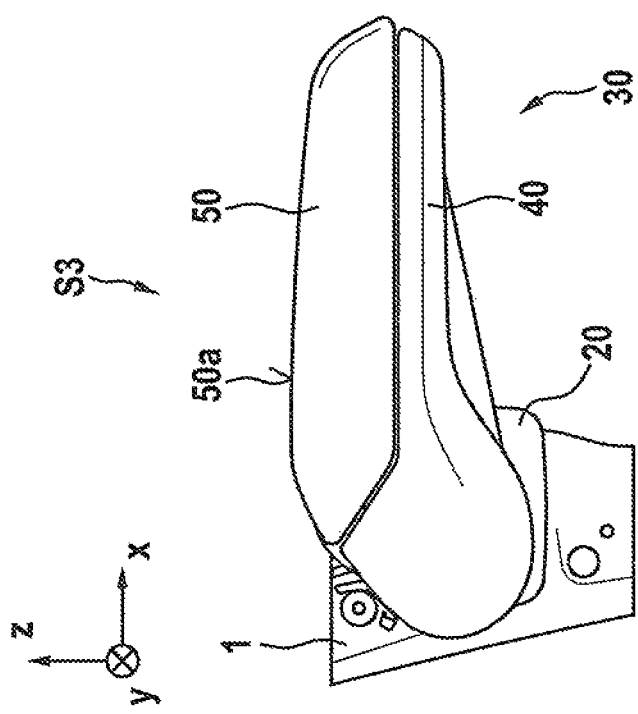

FIG. 3 illustrates the armrest arrangement 10 in a use state S3 with an approximately horizontal orientation, i.e. a pivoting angle of approximately 0°, for example in relation to the geometry and dimensioning of the arrangement according to FIG. 10.

Figure 4:
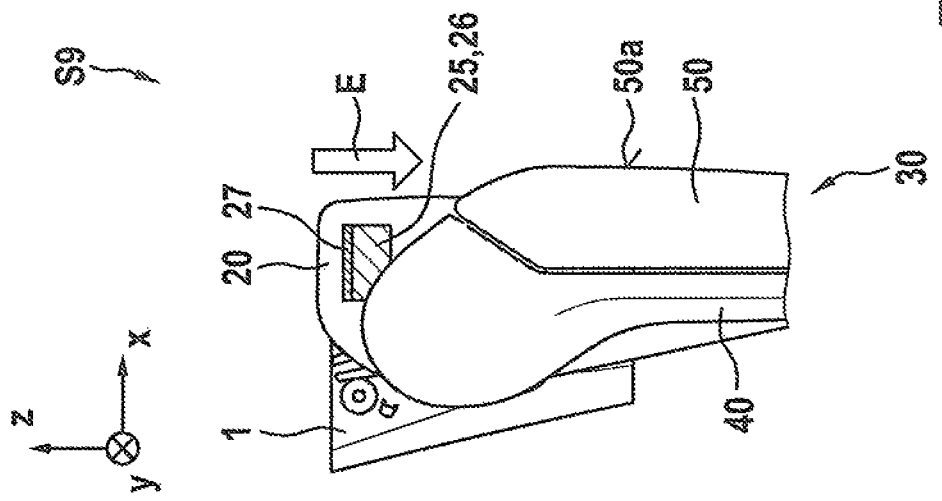

At the transition to the states S9, which are shown in FIGS. 4 to 6, with maximum pivoting in the opposite z direction of the tripod illustrated, a situation arises in which the pivoting in the vertical direction, i.e. in the direction opposite to the z direction, on the mounting fitting 20 results in the locking mechanism 25 with the actuating element 26 and the viewing area 27 being exposed for manual access and a corresponding actuation in the direction of the arrow E.

When the actuating element 26 is actuated, the locking mechanism 25 is unlocked, namely by displacement of the corresponding slider downward in the direction of the arrow E, i.e. along the z direction. In the process, for example, the pivoting and mounting pin 32, which is not illustrated in FIGS. 3 to 6, is released from the receptacle 22, and therefore the armrest body 30 can be pulled off in the axial direction of the pin 32. At the same time, a colored marking appears in the viewing area 27, the colored marking signaling the unlocked state of the locking mechanism 25. The display in the viewing area 27 returns into the original state with a neutral display only when the armrest body 30 is reattached to the mounting fitting 20, and the locking mechanism 24 is fully installed and thus locked.

FIG. 7 shows, in a schematic and perspective view, another embodiment of the armrest arrangement 10 in a state mounted on a vehicle seat 1.

FIGS. 8 and 9 show perspective exploded illustrations of a further embodiment of the armrest arrangement 10, in which parts of the internal construction of the mounting fitting 20 with the receiving part 22 for the pivoting and mounting pin 32, with the locking mechanism 25, the actuating element 26 in the form of a slider, and the viewing area 27 for visually illustrating a locked or unlocked state are shown.

FIG. 10 shows a further embodiment of the armrest arrangement 10 according to the invention with respect to various realizable pivoting positions S1 to S9 of an armrest body 10 in relation to a mounting fitting 20.

The pivoting positions S1 to S5 can also be summarized as latching positions of the armrest body 30 in relation to the mounting fitting 20 at angles of −14°, −7°, 0°, +7° and +14°, in each case with respect to the xy plane.

The pivoting position S9 already described above describes the position which is pivoted vertically downward, i.e. in the negative z direction, and which can be used for unlocking the armrest body 30 in relation to the mounting fitting 20.

Position S7 describes a pivoting position upwardly foldable to the maximum, position S6 describes a pivoting position for a switch-over point for a resetting, and position S8 describes a position for a release switching point for a locking.

The pivoting positions illustrated in FIG. 10 are presented purely by way of example; any other discrete or else continuous distributions of pivoting positions can be realized according to the invention.

FIGS. 11 and 12 explain, with reference to schematic diagrams, the construction and the function of the locking unit and of the components for the ejection function.

FIG. 12 illustrates the armrest arrangement 10 in sectioned form in a state mounted on a mounting fitting 20. The pivoting and mounting pin 32 with the pivot axis 31 is accommodated in the receiving opening 22 in the mounting fitting 20 and locked against axial displacement by engagement of a wire as a blocking element 34. When the pivoting and mounting pin 32 is mounted and thus introduced into the receiving part 22, the spring element 35 is compressed and thus pretensioned. The locking by means of engagement of the blocking element 34 in the form of the wire in the groove 33 prevents squeezing out of the mounting pin 32 from the receiving opening 22.

It is illustrated in FIG. 11 the way in which, by movement of the actuating element 26 in the direction opposite the z direction and thus counter to the tension of the spring element 28, the blocking element 34 in the form of the wire is moved via the driver elements 29 and is thus removed from the groove 33. The mounting pin 32 in the receiving part 22 is thereby unlocked and released. Under the effect and relaxation of the compressed spring element 35 while supported against the supporting element 36, for example against a bolt, on one side, and the housing of the trunk 40 of the armrest arrangement 10, on the other side, the mounting pin 32 when not locked, i.e. unlocked, is pushed by the bolt of the supporting element 36 under spring pretension out of the receiving opening 22 and ejected as it were.

These and further features and properties of the present invention will be explained in more detail with reference to the following:

Armrests are known, for example, for an individual seat in a vehicle, specifically on an inside of the vehicle, the armrests being formed with a rotatory height adjustment.

However, an armrest of this type conventionally does not have any depth adjustment for covering greater percentiles and, for example, also cannot be removed from the mounting region. This means that the space or passage between two individual seats has hitherto not been able to be optimally used.

A remedy for this is provided, for example, by a pivotable armrest 10 having a longitudinally displaceable padding support 50 and an additional interface of actuating unit 26 for removing the armrest 10 with a locking display 27.

It is possible according to the invention for a large percentile to be able to use the arm support 50 in a compact design. Removal of the armrest permits optimum passage in order to climb out of a third row of seats and between the individual seats, for example in order to thereby climb out of the vehicle.

LIST OF REFERENCE SIGNS

1 Vehicle seat
10 Armrest arrangement
20 Mounting fitting
22 Receiving part, receiving opening
25 Locking mechanism
26 Actuating element
27 Viewing area, viewing element
28 Spring, spring element
29 Driver element for blocking element 34
30 Armrest body
31 Pivot axis
32 Pivoting and mounting pin
33 Groove
34 Blocking element, blocking wire
35 Spring, spring element
36 Supporting element, bolt
40 Trunk
50 Support element
50a Arm support surface, support surface
E Unlocking
S1-S9 Pivoting position
V1, V2 Displacement position
x Spatial direction
y Spatial direction
z Spatial direction

What is claimed is:

1. An armrest arrangement for a vehicle seat, comprising:
a mounting fitting for mounting on the vehicle seat;
an armrest body having a trunk and having a support element with an arm support surface for receiving a user's arm during use of the armrest arrangement,
wherein the armrest body having the trunk is releasably attachable to the mounting fitting,
wherein the armrest body in a state attached to the mounting fitting is pivotable about a pivot axis in relation to the mounting fitting,
wherein the support element with the arm support surface is displaceable in relation to the trunk in a direction of longitudinal extent of the trunk, and
wherein the armrest body in a state attached to the mounting fitting is pivotable in relation to the mounting fitting to a plurality of releasably lockable pivoting positions with different angles of inclination of the armrest surface,
a pivoting and mounting pin via which the armrest body is mountable releasably with respect to the mounting fitting and about which the armrest body is pivotable in relation to the mounting fitting with definition of the pivot axis;
a receiving part, in the form of a receiving opening, for receiving the pivoting and mounting pin in a state of the armrest body attached to the mounting fitting; and
a wire as a blocking element for locking the pivoting and mounting pin against axial displacement within the receiving opening, wherein the wire is insertable into and removable from a groove.

2. The armrest arrangement according to claim 1, wherein either:
the pivoting and mounting pin is formed on the armrest body and the receiving part is formed on the mounting fitting, or
the pivoting and mounting pin is formed on the mounting fitting and the receiving part is formed on the armrest body.

3. The armrest arrangement according to claim 1, wherein the armrest body in a state attached to the mounting fitting is releasable from the mounting fitting in a predetermined pivoting position in relation to the mounting fitting, in the axial direction of the pivoting and mounting pin and/or in a controllable manner.

4. The armrest arrangement according to claim 1, further comprising:
a locking mechanism in a region of the mounting fitting, wherein
the locking mechanism is designed to automatically lock the armrest body to the mounting fitting when the armrest body is attached to the mounting fitting, and
the locking mechanism is manually actuatable and is designed so as, in the attached state of the armrest body, upon manual actuation to unlock the armrest body from the mounting fitting and to release it for removal.

5. The armrest arrangement according to claim 4, wherein the locking mechanism comprises:
an actuating element for the manual actuation; and
a mechanically controlled viewing area for visual indication of a state of the locking and/or of a state of the unlocking of the locking mechanism,
wherein the locking mechanism is designed to lock an armrest body only in a state completely attached to the mounting fitting, and/or to remove an armrest body which is unlocked or is not completely attached to the mounting fitting from a mounting position with power assistance by separating a pivoting and mounting pin and a receiving part from each other.

6. The armrest arrangement according to claim 5, wherein the actuating element is a button or slide.

7. The armrest arrangement according to claim 5, wherein the visual indication is a particular color indication.

8. The armrest arrangement according to claim 1, wherein
the support element is displaceable in relation to the trunk of the armrest body between a plurality of displacement positions, and
the displacement positions are designed to be releasably lockable via a ball-mounted support, support surface or rail and/or with pressure-point-controlled actuation.

9. A vehicle seat, comprising:
at least one armrest arrangement according to claim 1, wherein
the armrest arrangement is attached to a side surface of the vehicle seat.

10. A vehicle, comprising:
at least one vehicle seat according to claim 9, wherein
the armrest arrangement is attached to a side surface of the vehicle seat, which side surface is oriented toward an inside of the vehicle.

11. The armrest arrangement according to claim 1, wherein
the armrest body in a state attached to the mounting fitting is releasable from the mounting fitting only in a predetermined pivoting position in relation to the mounting fitting.

* * * * *